Dec. 5, 1933.    W. H. ALLEN ET AL    1,937,937
PROCESS FOR THE MANUFACTURE OF SODIUM CARBONATE MONOHYDRATE
Filed Jan. 31, 1930
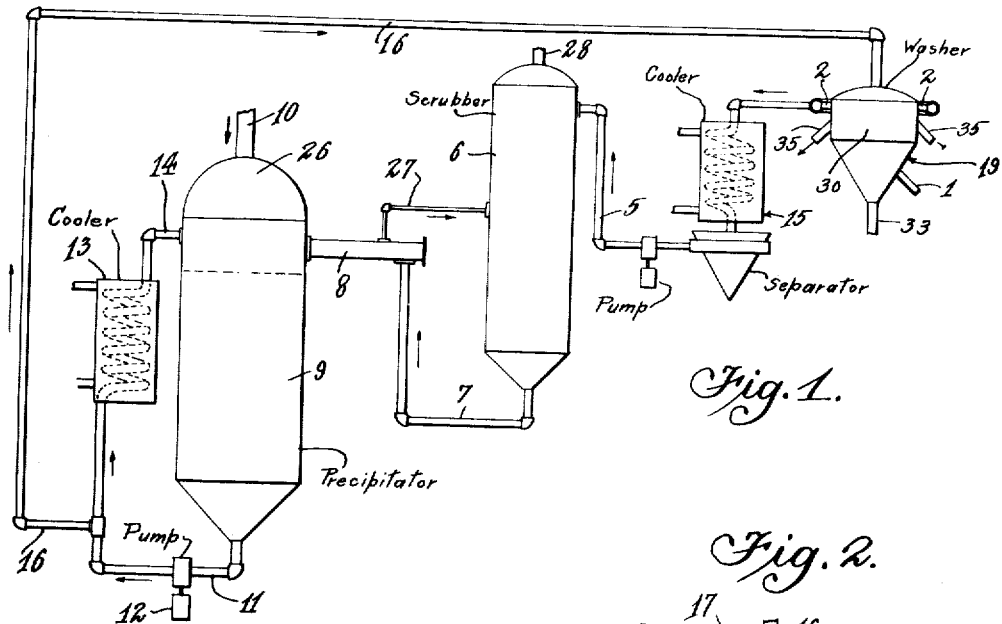
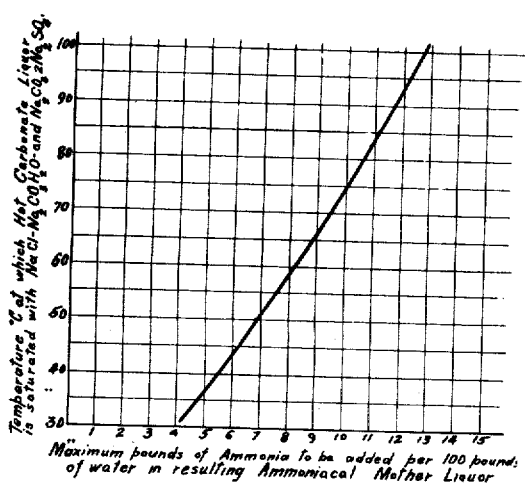
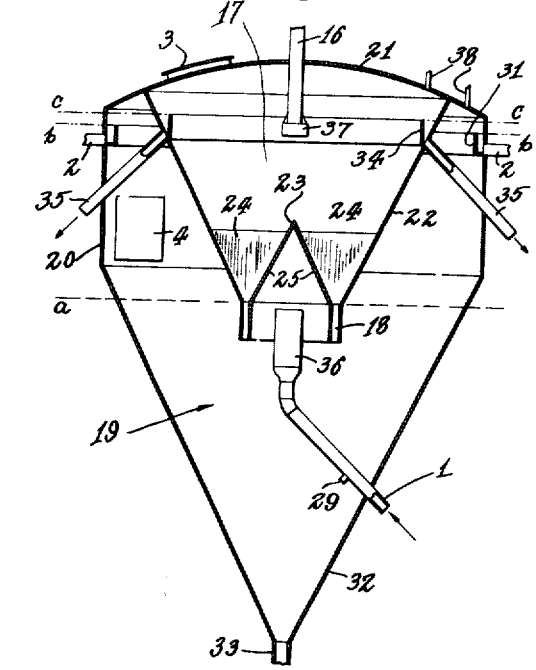
Inventors
William H. Allen
William A. Gale
Charles F. Ritchie
By
Lyon & Lyon
Attorneys Patented Dec. 5, 1933

1,937,937

UNITED STATES PATENT OFFICE 1,937,937

PROCESS FOR THE MANUFACTURE OF SODIUM CARBONATE MONOHYDRATE

William H. Allen, William A. Gale, and Charles F. Ritchie, Trona, Calif., assignors to American Potash & Chemical Corporation, Trona, Calif., a corporation of Delaware Application January 31, 1930. Serial No. 424,816

15 Claims. (Cl. 23—40)

This invention relates to a process for producing sodium carbonate monohydrate and sodium sulphate dekahydrate from mixtures of the same, together with other salts such as sodium chloride, which mixtures may exist in solid form or in solution.

We have devised the process of this invention for the particular purpose of separating sodium carbonate monohydrate, Glauber salt and sodium chloride from salt mixtures which are produced by the manipulation of Searles Lake brine in a process of producing potash and borax from the brine. However, the process may be employed upon similar mixtures obtained from other sources.

Certain features of the process herein illustrated, while of particular utility in the recovery of sodium carbonate monohydrate from complexes of the same together with sodium sulphate dekahydrate and sodium chloride, may also be applied for recovering other materials or salts from solution.

Our copending application for United States Letters Patent, filed February 1, 1930, No. 425,- 203 now Patent 1,836,426, sets forth in full and exact detail methods for manipulating solutions and solid mixtures containing in preponderance the chloride sulfate and carbonate of sodium. By the process of that invention such mixtures are manipulated, by means of heating, cooling, etc., in a cyclical or semi-cyclical manner, for the recovery of Glauber salt and the production of a solution termed "hot carbonate liquor", said hot carbonate liquor being essentially saturated with respect to sodium carbonate monohydrate, sodium chloride and a double salt of sodium carbonate and sodium sulphate termed "burkeite". Liquor of such composition contains relatively high percentages of sodium carbonate and sodium chloride, and a relatively low percentage of sodium sulphate. The process of the aforementioned application further sets forth a method for recovering from said hot carbonate liquor substantial quantities of essentially pure sodium carbonate in the form of sal-soda, said method comprising refrigeration of the hot carbonate liquor under suitable conditions.

Sal-soda or sodium carbonate dekahydrate is not, of itself, an important commercial commodity, and such is generally transformed to the anhydrous form, thereby producing the well known soda-ash of commerce. It is common practice in the art to produce the highly desirable dense form of soda ash by drying or dehydrating sodium carbonate monohydrate. Such operation probably results in a dense soda ash by virtue of retaining the crystal habit of the previously formed sodium carbonate monohydrate.

One method commonly practiced for reducing sal-soda to the monohydrated salt, from which very dense soda ash may be produced, comprises dissolving said sal-soda in water and boiling off the excess water, with consequent precipitation of the desired sodium carbonate monohydrate. Such process possesses the disadvantage that considerable heat is required and also that said manipulation results in rather serious coating of the heating elements of the evaporator with the precipitating salt.

One of the objects of the present invention is the production of sodium carbonate monohydrate directly from hot carbonate liquor or similar liquors high in sodium carbonate, thus eliminating the expensive steps of refrigerating said liquor for the production of sal-soda and also eliminating the undesirable step of heating and boiling water from said sal-soda, for its conversion into sodium carbonate monohydrate.

By the process of our invention, we treat suitable carbonate containing liquors with ammonia, causing the precipitation of sodium carbonate monohydrate directly therefrom. Another object of our invention is to further supply equipment and means for carrying out this object. These and other objects and advantages of the present invention will become obvious with the following disclosure.

It has long been kown that the addition of ammonia to aqueous solutions greatly reduces the solubilities of both sodium sulphate and sodium carbonate in the same, whereas the solubility of sodium chloride is not appreciably affected. Based upon this information, it has been attempted to separate these three salts from mixtures thereof in solution by the fractional and successive precipitation of sodium sulphate and sodium carbonate in pure form by the addition of ammonia while leaving the chloride in the ammoniacal mother liquor. The ammonia would then be recovered by distillation and returned to the process, while the sodium chloride would be crystallized by evaporation of the endliquor.

We have found, however, that such a process of fractional and successive precipitation of sodium sulphate and sodium carbonate from mixed solution is entirely inoperable due to the formation of the double salt burkeite, $(Na_2CO_3 \cdot 2Na_2SO_4)$ and its low solubility in the presence of ammonia.

We have discovered, however, that ammonia may be used for the precipitation of essentially pure sodium carbonate monohydrate from solutions of sodium carbonate, sodium sulphate and sodium chloride by first bringing the solution essentially to saturation with burkeite, sodium carbonate monohydrate and sodium chloride at a higher temperature. By this step of preliminary treatment, sodium sulphate, present in the original solution or raw material, is reduced to a relatively small value through precipitation in the form of burkeite, said burkeite being then removed from the hot liquor and returned to the process for the recovery of its component parts. The clear hot liquor is then cooled to a lower temperature whereby a small amount of sodium chloride may be crystallized. The latter may be removed by filtration or other suitable means, or sufficient water may be added either prior to or during cooling to prevent this separation of chloride.

Liquor thus processed may then be successfully treated with ammonia to precipitate a relatively large portion of the sodium carbonate in the form of essentially pure monohydrate. Care must be taken, however, not to add an excess of ammonia otherwise burkeite will be precipitated in sufficient quantity to contaminate the resulting product. The requisite quantity of ammonia to be added depends on the conditions chosen for carrying out the process of the present invention as will be seen from the further description contained herein.

According to the precepts set forth in said copending application, the higher the liquor, essentially saturated with burkeite, sodium carbonate monohydrate and sodium chloride, is heated, the greater will be the precipitation of burkeite and the reduction of sodium sulphate content. In order to obtain satisfactory results with the present process of precipitating sodium carbonate monohydrate from the saline liquor by the addition of ammonia thereto, it is requisite that very little sodium sulphate be present in said liquor. To this end it is necessary to heat the liquor so saturated, higher than would be necessary for carrying out the process of the aforementioned application, temperatures from 60° to 100° C. beng employed in the present case.

The commercial success of the present process, however, depends upon the feasibility of carrying it out without serious loss of ammonia. This is not difficult to accomplish except during the step of separating the precipitated sodium carbonate monohydrate from the ammoniacal mother liquor. Ordinary methods of separation, such as centrifuging or vacuum filtration of the salts directly from the ammoniacal mother liquor, would result in such a large loss of ammonia that the process would be rendered an economic failure. It is, therefore, a further object of this invention to supply suitable means for carrying out the process as described without appreciable loss of ammonia.

In order to more clearly describe our invention, we submit the following specific example, but we wish it understood that we do not limit the scope of our invention thereby.

The process as applied to the treating of certain salt complexes produced from Searles Lake brine is as follows: The complexes are called "clarifier salts" which consist mainly of sodium carbonate, sodium sulphate and sodium chloride, the greater part of the carbonate and sulphate being in the form of burkeite.

The salts are first leached to remove substantially all of the sodium chloride, as later explained. This leaching is accomplished by a solution termed "hot sulphate liquor", produced in a subsequent step of the process to which step the leached clarifier salts are recycled from the first operation. The leached clarifier salts contain approximately 34 percent sodium carbonate and 66 percent of sodium sulphate on a dry basis. However, the composition of the leached clarifier salt is subject to somewhat wide variation. To 1000 pounds of complex we add 1721 pounds of water and stir the mixture while maintaining the temperature between 22 and 25° C. Under these conditions of percentage of leached clarifier salt, water and temperature, the complex is digested within that field or condition of operation where sodium sulphate dekahydrate or Glauber salt is the constituent which precipitates first from the solution upon the solution becoming supersaturated. In this operation when the composition of the solution reaches saturation with sodium sulphate dekahydrate, this salt is precipitated while further burkeite is dissolved from the mixture and its sodium sulphate content reprecipitated as Glauber salt. The sodium carbonate content of the burkeite remains in solution and thereby a solution is obtained having a greater ratio of carbonates to sulphates than that which exists in the raw material. Said solution, freed from suspended solids is termed "cold sulphate liquor"; when heated to a higher temperature it is termed "hot sulphate liquor."

At the same time Glauber salt is attained which may be readily washed to produce a pure and valuable product. The conditions of operation as described are selected so that as a final result of the leaching and dissolving operation, the solution comes close to that of a saturated solution at the transition point between Glauber salt, sodium carbonate dekahydrate and the double salt burkeite. The transition point of the solution, entirely free of sodium chloride, is substantially 25° C. Approximately 825 pounds of Glauber salt is precipitated in these dissolving and digesting operations.

Approximately 1896 pounds of liquid is obtained which we term "cold sulphate liquor" and has the following composition:

|  | Pounds |
| --- | --- |
| Sodium carbonate | 340 |
| Sodium sulphate | 296 |
| Water | 1260 |

This cold sulphate liquor is then heated to some suitable temperature so that the composition is within the field that burkeite precipitates. The exact temperature of treatment is variable over a considerable limit.

The higher the temperature of the treatment the lower will be the sulphate content in the solution from which sodium carbonate monohydrate is to be precipitated. In order to secure an efficient recovery of the sodium carbonate monohydrate, we prefer to heat the solution to a temperature between 60° and 100° C.

This hot sulphate liquor is then brought to saturation with respect to sodium chloride. The saturation of the solution with sodium chloride causes the solution to precipitate burkeite which operation removes the majority of the residual sulphate content of the liquor. In saturating the hot sulphate liquor with sodium chloride, the sodium chloride required is preferably provided in part at least, by the sodium chloride content of the original clarifier salts. For this purpose the clarifier salt to be processed still containing the sodium chloride content is leached with the hot sulphate liquor. In certain cases the sodium chloride content of the clarifier salt may be sufficient to saturate the hot liquor. In other cases additional sodium chloride may be added. In any case, the amount of sodium chloride brought in contact with the hot sulphate liquor should be sufficient to produce saturation. The burkeite content of the clarifier salt remains undissolved and is collected with the burkeite precipitated from the hot liquor. It is this mixture of leached burkeite from clarifier salt and precipitated burkeite from hot liquor which is the starting material utilized in the first operation of the process.

So far, the process as herein described is in its operation similar to the first operations of our mentioned copending application except that the temperature to which the sulphate liquor is heated for saturating with sodium chloride is somewhat higher than that preferably employed in the process of the said copending application. For example, in the process of this application we use the preferred temperature of 75° C. The remaining steps of the process of this application are different from those of the copending application.

The liquor remaining after separation of the burkeite and other undissolved constituents we term "hot carbonate liquor". For the remaining steps of the process we take for example, 278,000 gallons of this hot carbonate liquor. This hot carbonate liquor when produced at 75° C. has a specific gravity of 1.28 and contains:

|   | Tons |
|---|---|
| Sodium carbonate | 166 |
| Sodium sulphate | 14 |
| Sodium chloride | 303 |
| Water | 1000 |

As stated in the prior application, this solution is essentially saturated with sodium chloride, sodium carbonate monohydrate and burkeite at the temperature at which it is prepared, in this case, 75° C. Liquor of this or similar composition, containing considerable sodium carbonate and relatively little sodium sulphate may be successfully treated with ammonia for the precipitation of sodium carbonate without appreciable precipitation of sodium sulphate. We prefer to carry out the ammonia treatment at some moderate temperature, such as atmospheric or 35° C., hence the afore-described hot carbonate liquor must be cooled prior to the precipitation step. While such cooling may be brought about either prior to or subsequent to the cyclical counterwashing step, to be described below, we prefer to carry out said cooling following the counterwashing step.

In cooling the hot carbonate liquor from 75° C. to 35° C., a small amount of sodium chloride may separate if said liquor was saturated therewith at 75° C. This salt is removed from the liquor by settling, centrifuging or other suitable means. Under the specific conditions of this example about 28 tons of salt are thus obtained. After being given a slight wash with water, this material is of sufficiently high purity for table salt use.

Said cooling to 35° C. or less does not bring about precipitation of the other sodium salts. In fact such cooling actually renders the liquor unsaturated therewith, and no sodium carbonate will be precipitated until the liquor is cooled well below 20° C. Mother liquor, or the clarified filtrate, resulting from this table salt recovery, is then ready for the ammonia treatment for the precipitation of sodium carbonate monohydrate.

The remaining steps of the process constituting this invention will be most readily understood from a description of a preferred form of apparatus in which the process embodying this invention may be carried out. For this purpose we have herein described a preferred form of the process embodying this invention as carried out in a suitable apparatus.

In the drawing:

Figure 1 is a diagrammatic view of the apparatus.

Figure 2 is an enlarged elevation mainly in vertical section of the salt settler employed in the apparatus of Figure 1.

Figure 3 is a chart from which the amount of ammonia to be used in the process and apparatus may be determined.

Referring to the drawing, we pass the clear hot liquor, at the continuous rate of about 200 gallons per minute into the counter washing chamber 19, of our settler-washer 30, by means of a suitable inlet line 1. This liquor leaves the counterwashing chamber 19 by way of a peripheral launder 31, and suitable outlets 2. Said outlets are connected to a suitable common collecting line by which the liquor is conducted to a suitable cooler and sodium chloride removal system 15. From the sodium chloride recovery system the clear liquor passes via line 5 to a suitable scrubber 6. This scrubber may be of any suitable design and is imposed in the cycle for the purpose of salvaging ammonia gas from various sources. Liquor flows from the bottom of the scrubber through line 7 to the precipitator 9 entering through an enlarged inlet 8.

Ammonia bearing gas is introduced into the precipitator by way of line 10, leading from a suitable source of supply, such as an ammonia still. The ammonia is very rapidly absorbed by the liquor in the precipitator, and it has been found unnecessary to introduce the ammonia at a point below the surface of the liquor. The absorption of ammonia causes a portion of the carbonate content of the liquor to be precipitated in the form of granular sodium carbonate monohydrate. This reaction evolves a considerable quantity of heat, and in addition, heat is evolved by the condensation of water vapor present in the incoming ammonia gas, since this gas is essentially saturated with water vapor as it leaves the ammonia still or subsequent condenser.

Means must be provided, therefore, for maintaining the temperature of the liquor in the precipitator at a suitable point, such as 35° C. We do this by circulating liquor through a cooler 13 of any suitable design by means of lines 11 and 14 and a pump 12. While a pump and an external cooler have been shown in Figure 1, equivalent means may be supplied within the shell of the precipitator itself, such details being those of engineering rather than invention.

The correct amount of ammonia to be added to the liquor depends upon the conditions of operation, such as the temperature at which the hot carbonate liquor was prepared and the temperature maintained within the precipitator. These relations have been determined for a wide variety of conditions and are shown graphically in Figure 3.

Within ordinary ranges, the temperature at which the precipitation of the monohydrate is carried out has little effect upon this curve, so that for practical purposes this one curve may be used at all precipitator temperatures between say, 20° and 50° C. Any large excess of ammonia above that indicated by the graph may cause the precipitation of an appreciable amount of sodium sulphate, as burkeite, which would not be redissolved by counter-washing with hot carbonate liquor, as herein described, and would contaminate the resulting soda ash.

Under the conditions of the specific example chosen, we add a maximum of 10 pounds of ammonia ($NH_3$) per 100 pounds of water present in the resulting mother liquor. The composition of the required amount of ammoniacal gas is approximately as follows:

| | Tons |
|---|---|
| Ammonia | 100 |
| Water vapor | 14 |
| Inert gas | 1 |
| Total | 115 |

This amount is controlled by varying the rates of flow of liquor to and from the precipitator through lines 7 and 16, respectively, as well as the rate of flow of ammonia gas entering the precipitator through line 10.

While various systems of ammonia absorption may be employed with considerable degree of success, some operating under reduced and some under increased pressure, we prefer to operate at or near atmospheric pressure.

It must be understood that the present method for producing sodium carbonate monohydrate from concentrated solution, is in no manner akin to the well known process for the manufacture of sodium bicarbonate and subsequently soda ash from sodium chloride by the use of ammonia and carbon dioxide gas. In such a case the ammonia is caused to enter into true chemical reaction with the components supplied. In the present case, ammonia, either in concentrated solution or as a gas, is added to the solution of already formed sodium carbonate. Its action of precipitation is simply a physical one, somewhat analogous to the well known salting-out action of soap from solution or possibly explained as a squeezing out action; for, ammonia gas possesses a remarkable affinity for water and consequently squeezes out many other dissolved substances in its effort to gain its place therein. Since the ammonia does not enter into chemical reaction with the component of the present system, it may be recovered by simply applying heat to the residual liquor containing the same. This is accomplished by means of any suitable ammonia boiler, the liberated gas being again utilized as means for further precipitation of sodium carbonate monohydrate from solution.

In the handling of such a system, the accumulation of a certain amount of non-condensible gas, such as air, is practically unavoidable, and we provide means for disposing of the same without loss of ammonia. Such non-condensible gas tends to collect in the vapor space 26 above the liquor level in the precipitator 9. We supply suitable vent line 27 for the removal of such, said vent lines discharging into the scrubber 6 in order to absorb any ammonia gas by means of the cold liquor passing to the precipitator. The present system maintains the pressure in space 26 slightly above that of the atmosphere; hence, the non-condensible gas is caused to flow over the surface of the incoming liquor in the enlarged inlet 8. Said gas, now containing only a small amount of ammonia, passes to the scrubber 6 by means of vent line 27. The remaining traces of ammonia are almost entirely removed from the non-condensible gas in the scrubber, from whence it passes to the atmosphere by way of vent 28.

A sludge consisting of the precipitated sodium carbonate monohydrate and ammoniacal mother liquor is drawn from the precipitator 9 at a suitable point, for example, by means of a pump 12 and a line 16, and is passed through said line into the settling chamber 17, of Figure 2, which is fitted with an annular conical bottom of unusual design and import. Said bottom terminates within the chamber 19. The suspended crystals of sodium carbonate monohydrate settle out of the ammoniacal mother liquor in chamber 17 and pass through the connecting annular opening 18 into the lower chamber 19 which is filled with the incoming hot carbonate liquor. Chamber 19 is also provided with a conical bottom 32 from which a small stream of a densely thickened sludge, essentially free of ammonia, is removed through an outlet 33, to a continuous vacuum filter, centrifugal or other suitable dewatering device. Filtrate from this step is returned to the process; for example, to the cooling and NaCl removal system.

The crop of sodium carbonate monohydrate so obtained amounts to approximately 94 tons, and after a slight displacing wash with warm water, it is dried in a rotary drier at about 100° to 150° C., thereby obtaining approximately 80 tons of the anhydrous salt. We have found that the soda ash produced in this way is of a high degree of purity, dense in nature and relatively free from fines. Its dustless quality results from the fact that the large crystal form of the precipitated monohydrate is essentially maintained by the resulting ash.

The ammoniacal mother liquor flows from the center of the settling chamber 17 radially to the circular launder 34. Said liquor now clarified of suspended crystals, leaves the settling chamber and collecting launder by means of lines 35, passing thence to an ammonia recovery still of suitable type. This clear liquor, flowing over the launder 34, has approximately the following composition:

| | Tons |
|---|---|
| $Na_2CO_3$ | 86 |
| $Na_2SO_4$ | 14 |
| NaCl | 275 |
| $NH_3$ | 100 |
| $H_2O$ | 1000 |
| Total | 1475 |
| Temperature | 35° C. |
| Specific gravity | 1.18 |

It will be noted that the specific gravity of this liquor is appreciably less than that of the hot carbonate liquor (spec. grav. 1.28) which overflows launder 31.

By the process of this invention, as described to this point, liquor containing sodium carbonate, sodium sulphate and sodium chloride is treated (heated) for the reduction of sodium sulphate to a tolerable value, a crop of sodium chloride is recovered by cooling and a crop of sodium carbonate monohydrate is successfully precipitated in an essentially pure state by the use of ammonia. Furthermore, the precipitated sodium carbonate monohydrate is effectively and economically separated from the ammoniacal mother liquor, without appreciable loss of either and without inconvenience to workmen employed in the process. The equipment depicted in Figure 2 is in a large measure responsible for the success of the last mentioned results, and we wish to describe herein the details of said equipment in order that one skilled in the art may be able to make use of the same.

The purpose of this equipment is to settle from the ammoniacal mother liquor the precipitated crystals and to pass said crystals into a lower disposed chamber wherein the crystals are counterwashed with a suitable fluid and again separated from the enveloping fluid.

For the purpose of compactness and other engineering considerations, we build the combined settler-washer as a single unit. Externally the unit comprises a right cylindrical section 20 which in the case described was 12 feet in diameter and about 5 feet high. A steep cylindrical cone 32 is affixed to the cylindrical section 20, forming the bottom of the unit and specifically the bottom of the lower chamber 19, the angle of said cone being about 60° in the case depicted in Figure 2.

A suitable top enclosure, such as the semi-dome 21 serves to complete the external boundaries of the unit. A circular launder 31 is affixed to the upper portion of the right cylindrical section 20 near the top for the removal of clarified liquor. The upper extremity of said launder fixes the level of the liquor within the chamber 19 at the indicated line $b$—$b$. This launder and take-off line 2 must be of sufficient size so as to carry off the maximum quantity of liquor supplied to the chamber without raising the level $b$—$b$ to any appreciable extent.

A truncated conical section 22 is affixed within the upper portion of the unit, forming the bottom of the upper chamber 17. In the case described, this is likewise a 60° cylindrical conical section and is affixed to the semi-dome cover 21. Unless the upper section 17 is raised above the lower section, some means for insulating the walls forming the upper section must be provided if a large temperature difference exists. The cones 22 and 23 may be constructed with double walls, with air space between for this purpose, as shown by 25. A circular launder 34 is provided for the upper section, said launder determining the level of the liquor within the upper section, as shown by line $c$—$c$.

As in the case of the previously described launder 31, the present one and its outlet lines 35 etc. must be of sufficient size to carry off all the liquor fed to the chamber 17. The diameter of the launder of upper section 17 is, in the case described, about 8 feet.

While it is possible to terminate the cylindrical conical section 22 by truncation at or near its apex, we prefer to cut it off at some point as represented by plane $a$—$a$, thereby providing an opening slightly greater than 3 feet in diameter. Over this opening we dispose annularly an inverted 60° conical section 23 having a base of slightly less than 3 feet, thus forming a circular or annular orifice at the plane $a$—$a$, said orifice being in the present case about one inch in width. This conical section is held in place by webs or baffle plates 24 disposed perpendicularly between the two conical sections 22 and 23, and welded or otherwise affixed thereto. The webs are employed primarily for the purpose described, but they are also of value in preventing vortex action, and may suitably be extended a considerable height above and below the plane $a$—$a$, as shown. An annular well or leg 18 having a width of about one inch is formed by affixing two concentric right cylindrical sections of proper diameter to the truncated cones 22 and 23 at their intersection with a plane $a$—$a$. Said cylindrical sections have, in the present case, a height of about eighteen inches, and are kept correctly spaced apart by extension of the baffles 24.

Liquor is supplied to the lower chamber 19 by means of line 1, terminating in an enlarged pipe section or other suitable device 36 which serves to introduce said liquor in a quiet or orderly manner. This enlarged section may be disposed within the space formed by the cone 23, and above the lower extremity of the depending annular well 18. A distributing cup 37 is placed at the extremity of the inlet line 16, just below the liquor level $c$—$c$ of the upper chamber 17. Suitable vent lines 38 are provided at various points on the unit for the removal of non-condensible gas, said lines passing into the scrubber 6 of Figure 1. The inverted tank or cone 23 into which the line 1 terminates may also be suitably vented. Inspection manholes such as 3 and 4 may be supplied for the chambers 17 and 19.

The principles of construction of this unit of our invention may be better understood with a more detailed explanation of the operation thereof. Various methods of filling the unit upon commencing operation may be employed.

Valves or plugs may be supplied for the depending leg 18 to facilitate the first filling operations. In the circular unit the lower chamber may be filled to plane $a$—$a$, and liquor then introduced at approximately equal rates to both chambers, until filled. A constant-hydrostatic-head tank, congruous with the inner chamber 17 but inverted, may obviously be employed for more exactly precise filling work.

With the two chambers filled, we are ready to commence operations. Vent outlet lines are opened and the normal flow of ammoniacal liquor containing precipitated salt is supplied to the upper chamber through line 16, and distributing cup 37. Liquor flows from the center of the cone to the peripheral launder 34 and in so doing drops its content of suspended crystals. The upper edge of the launder should be essentially level and adjusting means may be supplied to that end. Liquor overflowing the launder passes out the unrestricted take-off lines 35 to other suitable equipment,—an ammonia boiler in this instance. Crystals pass downward and are deflected by the sides of the cones into the annular well 18.

It has been mentioned in passing that the density of the ammoniacal liquor was considerably less than that of the hot carbonate liquor. It is upon this fact that the present equipment is made possible. By placing the lighter liquor, containing the solids and the greatest dissolved values (for example, ammonia) over the dense liquor substantially free of such values, we are able to maintain a static interface at the plane a—a. Said interface has been shown in the present case as corresponding approximately with the point of junction of the two conical sections, 22 and 23; although the same might have as well been shown as existing midway in the annular well 18. Due to the difference in densities of the two liquors, it is necessary that the height of the liquor in upper chamber 17 be greater than that of the lower chamber 19. This height difference in the present case calculates to about 5 inches. One of the objects of the depending annular well 18 is to compensate small errors in such calculations and variations in liquor densities, thus assuring a perfect static balance at all times,—maintaining the interfacial plane of the two liquors within the constricted zone of the depending well or legs.

With a properly constructed unit a surprising and most satisfactory line of demarcation is maintained at the point of junction of the two liquids, the lighter liquid being disposed above the heavier one. Unlike certain other schemes which have come to our attention, the operation of this equipment is not dependent upon the selection of an orifice or well of fixed size. We prefer to construct such well or wells 18 of large size, in order that very little concentration of crystals will take place in passing therethrough. In other words, it is our object to cause the crystals to fall through the depending well in a free and unobstructed manner, causing as little turbulence and entraining as little liquor as possible. Were it not for eddy currents in such hydraulic equipment, we would construct the orifice of considerably increased size. However, to prevent undue mixing and eddying of the two liquors at the interface, we prefer to restrict such openings to 1 to 2 inches for the specific construction of a 3-foot annular well handling approximately the specified quantity of material, thus providing a cross sectional area of about 1 square foot. Of course, this area is dependent upon the quantity and the settling rate of crystals produced, the latter in the present case being about 5 feet per minute.

As previously stated, quite a sharp line of demarcation is maintained at the interface of the two liquors, said interface being situated at or below the plane a—a. Crystals pass through the depending well 18 into the lower chamber 19. These crystals may entrain and possibly absorb a certain quantity of the values (ammonia) of the lighter solution. Such values are removed by washing the crystals with a suitable liquor; in this case, the hot carbonate liquor which is to be subsequently treated with ammonia. To this end, we introduce the hot carbonate liquor by means of line 1 into the lower chamber 19. In the indicated construction in which an annular well is employed, this liquor may advantageously be introduced centrally in the manner shown, which causes all of said liquor to pass through the curtain of crystals formed by their passage through the well 18. To this end it is preferable that the plane of the extremity of said well be level (horizontal), causing an equal distribution of liquor throughout the descending curtain of crystals. While a small stream of hot carbonate liquor may be introduced near the extremity of the cone 32 (as shown by orifice 29 on line 1), to produce a clearing out effect of the lower regions, we have found that generally such an expedient is unnecessary, since the lighter liquor containing the desired values tends to pass upward with the main ascending stream to the peripheral launder 31.

It is understood that the settling area of the several chambers should be sufficient to bring about essentially complete sedimentation of the suspended crystals from the mother liquors. In the circular unit depicted, the settling area provided for the lower chamber is considerably larger than that of the upper one in order to compensate for the increased turbulence and loss of effective settling area caused by the introduction of crystals and liquor into that chamber.

Hot carbonate liquor leaving the launder 31 containing a small amount of values carried into the lower chamber by the descending crystals, passes to the cooling and sodium chloride recovery system, and thence to the precipitator. The liquor leaving the precipitator containing suspended crystals and high values of ammonia is introduced into the upper chamber 17 through line 16, thus completing the cycle.

Clear liquor leaving the upper launder 34 passes to an ammonia boiler which serves to recover essentially all of that valuable commodity for subsequent re-use. Liquor from which the ammonia has been expelled may be discarded or it may be put through suitable processes for the recovery of residual values.

For example, said liquor already heated by virtue of the ammonia recovery step, may be subjected to vacuum cooling with the simultaneous removal of about 10 percent of the contained water, without precipitating any of the dissolved saline content. Such liquor cooled to about 35° C. will have the following approximate composition:

|  | Tons |
|---|---|
| $Na_2CO_3$ | 86 |
| $Na_2SO_4$ | 14 |
| NaCl | 275 |
| $H_2O$ | 890 |
| Total | 1265 |

Such liquor might well be subjected to further refrigeration at low temperature, resulting in the recovery of over half of the remaining 86 tons of sodium carbonate as essentially pure sal soda. The sodium sulphate content being low, the hot residual liquor might likewise be employed to advantage for the manufacture of caustic soda. Another alternative consists of treating the residual liquors with an acid gas such as carbon dioxide or sulfur dioxide, subsequently recovering a valuable crop of sodium bicarbonate or sodium bisulfite.

Another variation for the utilization of the residual values resides in employing the ammoniacal liquor, leaving upper chamber 17 in a modified ammonia soda process.

Such liquor contains sodium chloride and ammonia, two constituents requisite for production of sodium bicarbonate by the well known ammonia-soda process. Hence, carbon dioxide may be supplied to such liquor, in the usual equipment, for the production of sodium bicarbonate, the sodium carbonate content of the residual liquor as well as the sodium chloride content thereof contributing to the production of this valuable commodity.

We have thus described our process for the manufacture of sodium carbonate, and while said process is well adapted to carry out the objects of the present invention, various modifications and changes may be made without departing from the principles of this invention and this invention includes all such modifications and changes as come within the scope of the appended claims. The apparatus herein described is claimed in our co-pending application Serial No. 660,014.

We claim:

1. A process of treating sodium carbonate-sodium sulphate complexes which comprises, heating a solution of the complex to a temperature above the transition temperature of sodium carbonate and sodium sulphate (dekahydrates) to the double salt burkeite, which solution or complex contains a greater ratio of sodium carbonate to sulphate than the ratio of these salts in burkeite, then adding sodium chloride to the solution in sufficient quantities to depress the solubility of burkeite in the solution, and causing the solution to precipitate burkeite and materially increase the ratio of carbonate to sulphate, and adding ammonia to the solution to precipitate sodium carbonate monohydrate.

2. A process of treating sodium carbonate-sodium sulphate complexes which comprises, heating the solution of the complex containing a greater ratio of carbonate to sulphate than the ratio of these constituents in burkeite to a temperature substantially above the transition temperature of sodium carbonate and sodium sulphate to the double salt burkeite, adding sodium chloride to the solution to nearly saturate the same therewith and precipitate burkeite from the solution, the solution operated upon containing a ratio of carbonate to sulphate sufficiently high so that such precipitation of burkeite brings the composition of the solution nearly to saturation with sodium carbonate monohydrate, and adding ammonia to the solution to precipitate sodium carbonate monohydrate.

3. A process of treating sodium carbonate-sodium sulphate complexes which comprises, heating a solution of the complex to a temperature substantially above the transition point of sodium carbonate and sodium sulphate to the double salt burkeite, which solution contains a carbonate-sulphate ratio substantially corresponding to the ratio of carbonate to sulphate of a solution at said transition point, substantially saturating the solution with sodium chloride, thereby precipitating burkeite, and adding ammonia to the solution to precipitate sodium carbonate monohydrate.

4. A process of treating sodium carbonate-sodium sulphate complexes which includes the following cycle of operations: digesting a complex of sodium carbonate-sodium sulphate within the Glauber salt field while precipitating Glauber salt and producing a solution near the composition of the solution at the transition point between sodium carbonate dekahydrate, Glauber salt and burkeite, then heating the solution to a temperature substantially above the temperature of said transition point, saturating the solution with sodium chloride to precipitate burkeite, and adding ammonia to the solution to precipitate sodium carbonate monohydrate.

5. A process of producing sodium carbonate monohydrate from sodium carbonate-sodium sulphate complexes which comprises: first digesting a complex of sodium carbonate-sodium sulphate within the Glauber salt field while precipitating Glauber salt and producing a solution near the composition of the transition point between sodium carbonate dekahydrate, Glauber salt and burkeite, and adding ammonia to the solution to precipitate sodium carbonate monohydrate.

6. A process of treating sodium carbonate-sodium sulphate complexes which includes the following cycle of operations: digesting a complex of sodium carbonate-sodium sulphate within the Glauber salt field while precipitating Glauber salt and producing a solution near the composition of the transition point between sodium carbonate dekahydrate, Glauber salt and burkeite, then heating the solution to a temperature substantially above the temperature of said transition point, saturating the solution with sodium chloride to precipitate burkeite, and adding ammonia to the solution to precipitate sodium carbonate monohydrate, the burkeite being precipitated being recycled to the digesting operation.

7. A process of treating sodium carbonate-sodium sulphate complexes which comprises, heating a solution of the complexes to a temperature substantially above the transition point of the dekahydrates of sodium carbonate and sodium sulphate to the double salt burkeite, which solution contains a carbonate-sulphate ratio substantially corresponding to that of a solution at said transition point, substantially saturating the solution with sodium chloride, thereby precipitating burkeite, the saturation of the solution with sodium chloride being effected by adding a mixture of sodium chloride and burkeite in just sufficient quantities so that substantially all of the sodium chloride content of the mixed salt is dissolved in saturating the solution, and adding ammonia to the solution to precipitate sodium carbonate monohydrate.

8. A process of separating sodium carbonate and sodium sulphate complexes which comprises the following cycle of operations: dissolving a complex of sodium carbonate and sodium sulphate in such proportions and at such temperature so the resulting solution first becomes saturated with Glauber salt and precipitates a Glauber salt during further solution of the sodium carbonate and sodium sulphate, then precipitating burkeite from the solution, adding ammonia to the solution to precipitate sodium carbonate monohydrate and separating and recycling the burkeite to the first operation.

9. A process of producing sodium carbonate monohydrate from complexes of sodium carbonate and sodium sulphate which comprises, first precipitating a major part of sodium sulphate from the solution while replacing the same with sodium chloride, and then adding ammonia to the solution to precipitate the sodium carbonate monohydrate.

10. A process of producing sodium carbonate monohydrate from complexes of sodium carbonate and sodium sulphate which comprises, first precipitating the sulphate content of the complex from a solution of the same to form a hot liquor substantially saturated with respect to sodium carbonate monohydrate, then adding ammonia to the liquor to precipitate sodium carbonate monohydrate and passing the precipitated sodium carbonate monohydrate into the carbonate liquor so as to displace the ammoniated solution adhering to said precipitate with the hot carbonate liquor.

11. A process of producing sodium carbonate monohydrate from a solution of sodium carbonate and sodium sulphate which includes, first precipitating a part of the sulphate content of the liquor and replacing the same with chloride, and then adding ammonia to the solution in sufficient quantities to precipitate sodium carbonate monohydrate.

12. A process of producing sodium carbonate monohydrate from a solution of sodium carbonate and sodium sulphate which comprises, heating the solution and saturating the same with sodium chloride to precipitate sulphates from the solution as burkeite, cooling the solution and adding ammonia to the solution, to precipitate sodium carbonate monohydrate.

13. A step in the process of precipitating a salt by the addition of ammonia which comprises, creating a static interface between the relatively heavier nonammonia bearing liquor from which the salt is yet to be precipitated and the relatively lighter ammoniated liquor while permitting the precipitate to pass through the interface so that the ammoniacal liquor adhering thereto will be displaced by the heavier nonammonia bearing liquor.

14. A process of precipitating salt from a solution by the addition of ammonia which includes, passing the liquor before saturation with ammonia to a displacing zone, hence passing the liquor into a zone wherein it is caused to absorb ammonia, and returning the ammonia bearing liquor and precipitated salt to the displacing zone and therein disposing said liquor and precipitated salts over the fresh liquor in said zone while maintaining a static interface between the liquors through which the precipitate from the ammonia bearing liquor may pass into the fresh liquor.

15. A cyclical process of treating complex mixtures of sodium carbonate, sodium chloride and sodium sulphate which comprises digesting a complex mixture of sodium carbonate and sodium sulphate, essentially free of sodium chloride in water while maintaining the system at a temperature below the transition point of Glauber salt and sal-soda to the anhydrous double salt burkeite, precipitating Glauber salt while forming a solution essentially saturated with Glauber salt and sal-soda at said temperature, separating Glauber salt from said solution, heating the solution to a temperature substantially above said transition point, treating a complex mixture of sodium carbonate, sodium chloride and sodium sulphate with said heated liquor, bringing the system to saturation with sodium chloride at said elevated temperature, thereby precipitating a substantial portion of the sodium sulphate in the liquor as burkeite and forming a hot carbonate liquor, separating the solid residue from the hot carbonate liquor, returning said residue substantially freed of sodium chloride to the cold water digesting step of the process, cooling the hot carbonate liquor to precipitate pure sodium chloride, separating said sodium chloride, treating the cooled liquor with ammonia to precipitate pure sodium carbonate monohydrate, settling said carbonate from the ammoniacal mother liquor, counter-washing said carbonate with clarified hot carbonate liquor to displace the residual ammonia values therefrom, said hot carbonate liquor being employed for the recovery of sodium chloride and sodium carbonate monohydrate as described, and finally separating the ammonia-free sodium carbonate monohydrate from the enveloping liquid.

WM. H. ALLEN.
WILLIAM A. GALE.
CHARLES F. RITCHIE.